United States Patent [19]

Nitschke

[11] 4,130,019
[45] Dec. 19, 1978

[54] SELF-COMPENSATING THERMOCOUPLE READING CIRCUIT

[76] Inventor: John S. Nitschke, 324 E. Second, Perrysburg, Ohio 43551

[21] Appl. No.: 805,067

[22] Filed: Jun. 9, 1977

[51] Int. Cl.$^2$ .......................... G01K 7/10; G01K 7/12
[52] U.S. Cl. ........................................ 73/341; 73/361
[58] Field of Search ................. 73/341, 359 R, 359 A, 73/361

[56] References Cited
U.S. PATENT DOCUMENTS

| 3,459,925 | 8/1969 | Goosay et al. | 73/361 X |
| 3,984,772 | 10/1976 | Bohler et al. | 324/130 X |

Primary Examiner—James J. Gill
Attorney, Agent, or Firm—Reising, Ethington, Barnard, Perry & Brooks

[57] ABSTRACT

A plurality of thermocouples are connected to reading circuit conductors at an isothermal junction block, for selective connection to the input of an operational amplifier. The resulting output signals from the operational amplifier are monitored and stored in a computer. A reference thermocouple is selectively connected to the operational amplifier through a reference junction compensator — the reference junction compensator provides a compensated connection of the reference thermocouple with the reading circuit conductors. The signal at the output of the operational amplifier when the reference thermocouple is connected at the input is also monitored by the computer and stored for processing. In the computer, the signal sensed and stored when the reference thermocouple is connected to the operational amplifier is subtracted from the sensed, stored signals generated when the other thermocouples are connected to the operational amplifier. This subtraction nullifies the offset error of the operational amplifier (and the offset error of other reading circuit electronics such as the multiplexer selectively connecting the thermocouples to the operational amplifier), and it corrects the temperature indications of the thermocouples by eliminating the error of the cold junction at the isothermal junction block. These corrections are inherent, and are maintained without any surveillance or periodic adjustment.

4 Claims, 1 Drawing Figure

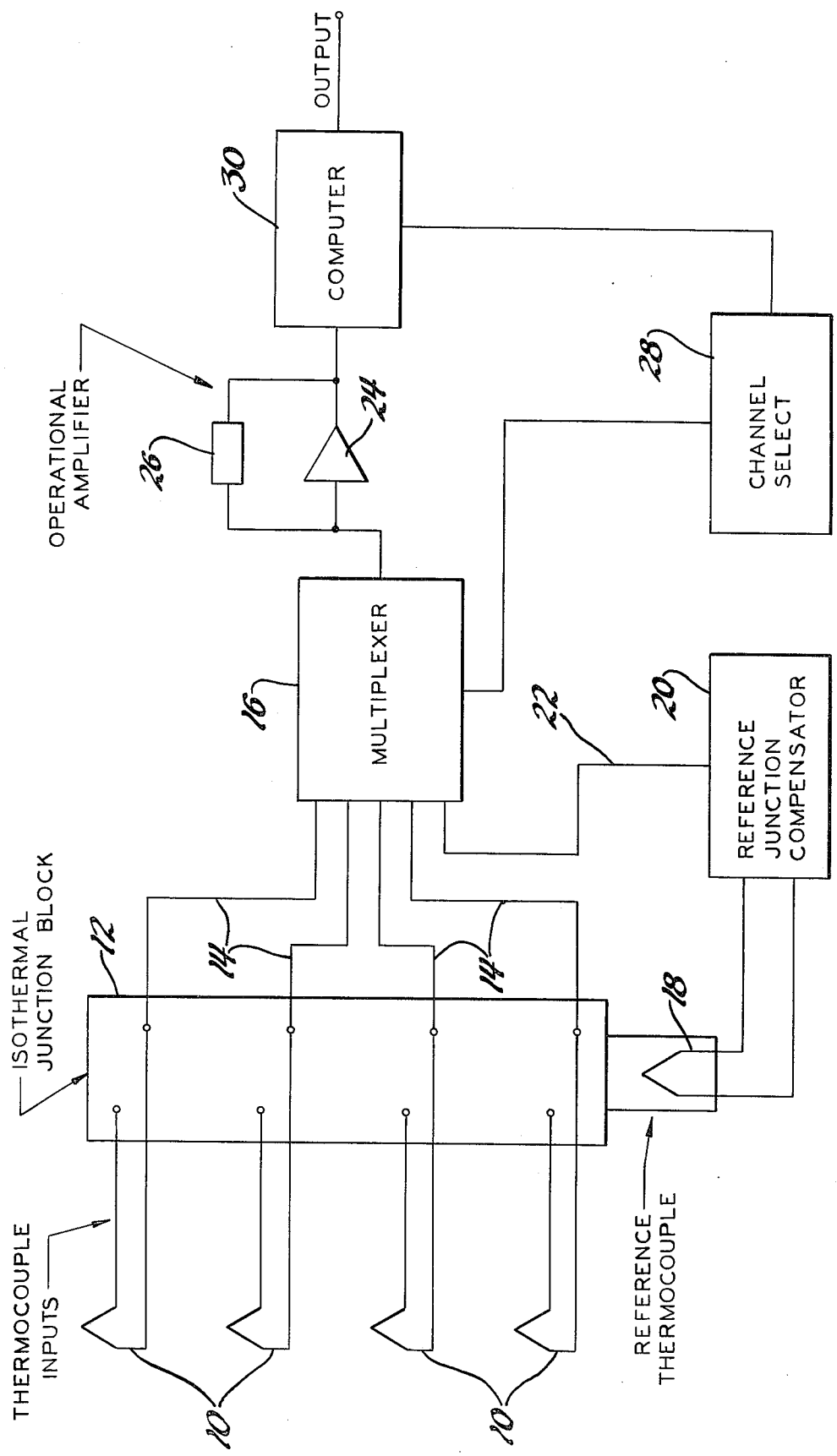

SELF-COMPENSATING THERMOCOUPLE READING CIRCUIT

FIELD OF THE INVENTION

This invention relates to a thermocouple reading circuit of a type particularly suited for use in multiple-zone equipment, such as glass tempering furnaces.

DESCRIPTION OF THE PRIOR ART

Operational amplifiers are commonly used in thermocouple reading circuits. A thermocouple connected to an operational amplifier will cause an output signal having three components: a voltage proportional to the hot junction of the thermocouple, plus a voltage proportional to the cold junction of the thermocouple with reading circuit conductors, plus an error voltage based upon the offset voltage of the operational amplifier. In the prior art, thermistor compensation has been used to eliminate the voltage which is proportional to the cold junction connection of the thermocouple with reading circuit conductors. Also, in the prior art, offset voltage errors are minimized by the selection of offset compensated operational amplifiers and periodic adjustment.

The use of thermistor compensation for cold junction errors requires conversion of thermistor resistance to temperature. The selection of compensated operational amplifiers, and the maintenance necessary to minimize offset error in operational amplifiers, demands surveillance of prior art thermocouple reading circuits.

SUMMARY OF THE INVENTION

The present invention uses a reference thermocouple to compensate for the cold junction voltage error resulting from the connection of thermocouples to reading circuit conductors. And the processing of the signal generated by the reference thermocouple effects positive elimination of all offset errors, i.e., the offset of the operational amplifier as well as the offset of other reading circuit electronics. As a result, using the present invention, accurate temperature measurements are made simply and reliably. No intermediate calculations are necessary. No maintenance or circuit adjustments are necessary.

A plurality of thermocouples are connected at an isothermal junction block to reading circuit conductors for selective connection to an operational amplifier. A reference thermocouple senses the temperature at the isothermal junction block, and the reference thermocouple is selectively connected through a reference junction compensator to the operational amplifier. A computer senses and stores the output signals from the operational amplifier. The output signal generated when the reference thermocouple is connected to the operational amplifier is subtracted from the output signal generated by each of the plurality of thermocouple inputs to thereby provide signals proportional to the junction temperatures of the thermocouples, free of cold junction errors introduced at the isothermal junction block, and free of offset errors.

It is an object of the present invention to provide a self-compensated thermocouple reading circuit which inherently nullifies offset errors arising in the reading circuit.

It is another object of the present invention to provide a self-compensated thermocouple reading circuit wherein a reference thermocouple developes a signal to eliminate the cold junction error which arises when the thermocouples are connected to reading circuit conductors.

It is another object of the present invention to provide a thermocouple reading circuit compensated for the error introduced at the cold junction of the thermocouple with reading circuit conductors and the error introduced by the offset characteristic of the operational amplifier and other electronics in the reading circuit.

BRIEF DESCRIPTION OF THE DRAWINGS

The instant invention can be best understood by reference to the following description of a preferred embodiment taken in connection with the accompanying single FIGURE drawing showing the thermocouple reading circuit in schematic form.

DESCRIPTION OF THE PREFERRED EMBODIMENT

Reference should now be made to the drawing wherein the reading circuit of the present invention is shown in schematic form. A plurality of thermocouples 10 sense temperatures to be monitored. For example, thermocouples 10 can be located in the various zones of a multiple-zone furnace, such as that used for tempering glass. The thermocouples 10 are in turn connected to an isothermal junction block 12 at which the thermocouples are connected to reading circuit conductors 14. The thermocouples 10 can be of various known pairs of dissimilar conductors, for example chromel alumel, and the reading circuit conductors 14 will typically be of copper. The conductors 14 are connected to the input of a multiplexer 16.

A reference thermocouple 18 is embedded in the isothermal junction block to develop a voltage proportional to the temperature of the cold junction of the thermocouples 10 at the isothermal junction block 12. It should be understood that the thermocouple 18 typically includes the same dissimilar conductors as the thermocouples 10. The reference thermocouple 18 is connected to a reference junction compensator 20 which permits compensated connection (with a reversal of polarity) of the reference thermocouple 18 to a reading circuit conductor 22. The reading circuit conductor 22, like the reading circuit conductors 14, is typically copper. The reference junction compensator 20 is a conventional circuit element effecting voltage compensation of the signal from the reference thermocouple 18 to nullify the error inherent in the connection of the thermocouple 18 to the reading circuit conductor 22 at the temperature of the reference junction.

The multiplexer 16 can take a variety of known forms. Its output is connected to an operational amplifier 24 provided with a suitable feedback network 26, typically comprising precision resistors. The multiplexer 16 will selectively connect one of the conductors 14 or the conductor 22 to the input of the operational amplifier 24 in response to a command signal from the channel select 28. The channel select 18 is also conventional, and available in the art.

The operational amplifier 24 is connected to a processing means or computer 30. The computer 30 includes means to convert the output of the operational amplifier 24 to digital form for storage and processing in the computer. Channel select 28 is controlled by the computer 30. The computer 30 is of a conventional type, generally available in the art.

The output from the computer 30 is a control signal, for example to regulate the supply of power to the various furnace zones whose temperatures are sensed by the thermocouples 10.

The circuit of the schematic operates as follows. The thermocouples 10 are selectively connected to the operational amplifier 24 through the multiplexer 16 is response to command signals from the channel select 28 which in turn is controlled by the computer 30. The computer 30 senses and stores the output voltage levels from the operational amplifier 24 developed when the various thermocouples 10 are connected to the input of the operational amplifier 24. For each thermocouple 10, the sensed, stored voltage in the computer 30 is built up of three components: a voltage proportional to the temperature at the hot junction of the thermocouple (for example, the temperature in the furnace zone monitored by the respective thermocouple), minus the voltage developed by the thermocouple at the temperature of the isothermal junction block 12, plus the offset voltage of reading circuit electronics (principally the offset voltage of the operational amplifier 24 but also including the offset voltage of the multiplexer 16). The reference thermocouple 18 provides a voltage on conductor 22, corrected by reference junction compensator 20 for the cold junction error inherent in the connection of the thermocouple 18 to the reading circuit conductor 22. The reference junction compensator 20 also reverses the polarity of the voltage generated by the reference thermocouple 18 at the temperature of the isothermal junction block 12. When the voltage on conductor 22 is selectively connected to the operational amplifier 24 by command of the channel select 28 to the multiplexer 16, the voltage sensed and stored by the computer 30 is built up of the following components: the voltage (with a negative polarity) developed by the junction of the reference thermocouple at the temperature of the isothermal junction block 12 plus the same offset voltage referred to in connection with thermocouple 10. This signal is subtracted from each sensed, stored signal generated by the thermocouples 10. The differences are an accurate indicator of the temperature at the respective thermocouple junctions 10, free of cold junction errors introduced at the isothermal junction block 12, and free of all reading circuit electronic offset voltages. These signals can in turn be compared with reference signals to effect power control to the furnace zones, or other control as desired.

Although the foregoing has proceeded in terms of a particular preferred embodiment, it is to be understood that various changes and modifications could be engrafted thereon by one skilled in the art within the spirit and scope of the appended claims.

I claim:

1. A self-compensating thermocouple reading circuit comprising:
    a first thermocouple adapted to sense a temperature to be monitored;
    an isothermal junction block at which said first thermocouple is connected to reading circuit conductors;
    a second thermocouple adapted to sense the temperature of said isothermal junction block;
    a reference junction compensator connected to said second thermocouple to effect a compensated connection of said second thermocouple to reading circuit conductors;
    an amplifier;
    means for selectively connecting either said first thermocouple or said second thermocouple to said amplifier;
    and means connected to the output of said amplifier to subtract the signal developed when said second thermocouple is connected to said amplifier from the signal developed when said first thermocouple is connected to said amplifier to thereby generate a signal proportional to the temperature to be monitored corrected for both the junction error at said isothermal junction block and the offset error of said amplifier.

2. A self-compensating thermocouple reading circuit comprising:
    a first thermocouple adapted to sense a temperature to be monitored;
    an isothermal junction block at which said first thermocouple is connected to reading circuit conductors;
    a second thermocouple adapted to sense the temperature of said isothermal junction block;
    a reference junction compensator connected to said second thermocouple to effect a compensated connection of said second thermocouple to reading circuit conductors;
    an amplifier;
    a multiplexer for selectively connecting either said first thermocouple or said second thermocouple to said amplifier;
    and means connected to the output of said amplifier to subtract the signal developed when said second thermocouple is connected to said amplifier from the signal developed when said first thermocouple is connected to said amplifier to thereby generate a signal proportional to the temperature to be monitored corrected for both the junction error at said isothermal junction block and the offset errors of said amplifier and said multiplexer.

3. A self-compensating thermocouple reading circuit comprising:
    a thermocouple adapted to sense a temperature to be monitored;
    an operational amplifier;
    connecting means for selectively connecting said thermocouple to said operational amplifier;
    means for providing an input to said operational amplifier whereby the output of said operational amplifier reflects the offset error of said operational amplifier and a connecting error introduced by said connecting means upon connecting said thermocouple to said operational amplifier;
    and means for subtracting the output of said operational amplifier reflecting the offset error and the connecting error from the output of said operational amplifier when said thermocouple is connected to the input thereof to thereby generate a signal proportional to the temperature at the junction of said thermocouple corrected for the offset error of said operational amplifier and the connecting error of the connecting means.

4. A self-compensating thermocouple reading circuit comprising:
    a plurality of thermocouples adapted to sense respective temperatures to be monitored;
    an isothermal junction block at which said plurality of thermocouples are connected to reading circuit conductors;

a reference thermocouple adapted to sense the temperature of said isothermal junction block;
a reference junction compensator at which said reference thermocouple is connected to reading circuit conductors;
an amplifier;
means for selectively connecting each of said plurality of thermocouples and said reference thermocouple to said amplifier;
and means connected to the output of said amplifier for generating a plurality of signals respectively proportional to the temperatures at the junctions of said plurality of thermocouples corrected for both the cold junction error of said plurality of thermocouples at said isothermal junction block and the offset error of said amplifier.

* * * * *

UNITED STATES PATENT AND TRADEMARK OFFICE
CERTIFICATE OF CORRECTION

PATENT NO. : 4,130,019

DATED : December 19, 1978

INVENTOR(S) : John Stephen Nitschke

It is certified that error appears in the above—identified patent and that said Letters Patent are hereby corrected as shown below:

Column 2, line 60, "18" should be -- 28 --

Column 3, line 7, "is" should be -- in --.

Signed and Sealed this

Twelfth Day of June 1979

[SEAL]

Attest:

RUTH C. MASON
Attesting Officer

DONALD W. BANNER
Commissioner of Patents and Trademarks